(12) United States Patent
Bashyam et al.

(10) Patent No.: US 11,355,759 B2
(45) Date of Patent: Jun. 7, 2022

(54) MEMBRANE ELECTRODE ASSEMBLY WITH IMPROVED COHESION

(71) Applicant: Ballard Power Systems Inc., Burnaby (CA)

(72) Inventors: Rajesh Bashyam, Richmond (CA); Alan Young, Surrey (CA)

(73) Assignee: BALLARD POWER SYSTEMS INC., Burnaby (CA)

( * ) Notice: Subject to any disclaimer, the term of this patent is extended or adjusted under 35 U.S.C. 154(b) by 128 days.

(21) Appl. No.: 16/604,537

(22) PCT Filed: Apr. 13, 2018

(86) PCT No.: PCT/US2018/027616
§ 371 (c)(1),
(2) Date: Oct. 10, 2019

(87) PCT Pub. No.: WO2018/191693
PCT Pub. Date: Oct. 18, 2018

(65) Prior Publication Data
US 2021/0126262 A1    Apr. 29, 2021

Related U.S. Application Data

(60) Provisional application No. 62/485,325, filed on Apr. 13, 2017.

(51) Int. Cl.
| | | |
|---|---|---|
| *H01M 4/92* | (2006.01) | |
| *H01M 4/86* | (2006.01) | |
| *H01M 4/88* | (2006.01) | |
| *H01M 8/1004* | (2016.01) | |
| *H01M 8/1023* | (2016.01) | |
| *H01M 8/1039* | (2016.01) | |
| *H01M 8/1044* | (2016.01) | |
| *H01M 8/10* | (2016.01) | |

(52) U.S. Cl.
CPC ....... *H01M 4/8668* (2013.01); *H01M 4/8657* (2013.01); *H01M 4/881* (2013.01); *H01M 4/8828* (2013.01); *H01M 4/926* (2013.01); *H01M 8/1004* (2013.01); *H01M 8/1023* (2013.01); *H01M 8/1039* (2013.01); *H01M 8/1044* (2013.01); *H01M 2008/1095* (2013.01)

(58) Field of Classification Search
CPC ............. H01M 4/8668; H01M 4/8673; H01M 4/8663; H01M 4/8657; H01M 4/881; H01M 4/8807; H01M 4/8828; H01M 4/926; H01M 8/1004; H01M 8/1023; H01M 8/1039; H01M 8/1044; H01M 2008/1095

See application file for complete search history.

(56) References Cited

U.S. PATENT DOCUMENTS

| | | |
|---|---|---|
| 8,034,509 B2 | 10/2011 | Inagaki et al. |
| 2003/0198860 A1 | 10/2003 | Yasumoto et al. |
| 2005/0287419 A1 | 12/2005 | Kim et al. |
| 2010/0092830 A1 | 4/2010 | Hayashi et al. |
| 2011/0008707 A1* | 1/2011 | Muraoka ............. H01M 8/1013 429/483 |
| 2011/0053051 A1 | 3/2011 | Park et al. |
| 2011/0229795 A1* | 9/2011 | Niu ..................... H01M 4/9075 429/483 |
| 2011/0256472 A1 | 10/2011 | Kim et al. |
| 2011/0294037 A1 | 12/2011 | Ji et al. |
| 2017/0014780 A1 | 1/2017 | Birss et al. |
| 2018/0051380 A1* | 2/2018 | Yoon ........................ C25B 1/04 |

FOREIGN PATENT DOCUMENTS

| | | |
|---|---|---|
| CN | 1462490 A | 12/2003 |
| CN | 101559386 A | 10/2009 |
| CN | 102263271 A | 11/2011 |
| CN | 104815647 A | 8/2015 |
| JP | 2003-263999 A | 9/2003 |
| JP | 2006-134679 A | 5/2006 |
| JP | 2011-228261 A | 11/2011 |
| JP | 2015-162309 A | 9/2015 |
| KR | 10-2015-0061538 A | 6/2015 |
| WO | 2008/093731 A1 | 8/2008 |

OTHER PUBLICATIONS

Banham, D. et al.; "A review of the stability and durability of non-precious metal catalysts for the oxygen reduction reaction in proton exchange membrane fuel cells" Journal of Power Sources vol. 285; pp. 334-348; 2015.

* cited by examiner

*Primary Examiner* — Raymond Alejandro
(74) *Attorney, Agent, or Firm* — Seed Intellectual Property Law Group LLP

(57) ABSTRACT

A membrane electrode assembly comprises an anode electrode comprising an anode catalyst layer; a cathode electrode comprising a cathode catalyst layer; and a polymer electrolyte membrane interposed between the anode electrode and the cathode electrode; wherein at least one of the anode and cathode catalyst layers comprises a block copolymer comprising poly(ethylene oxide) and poly(propylene oxide).

10 Claims, 5 Drawing Sheets

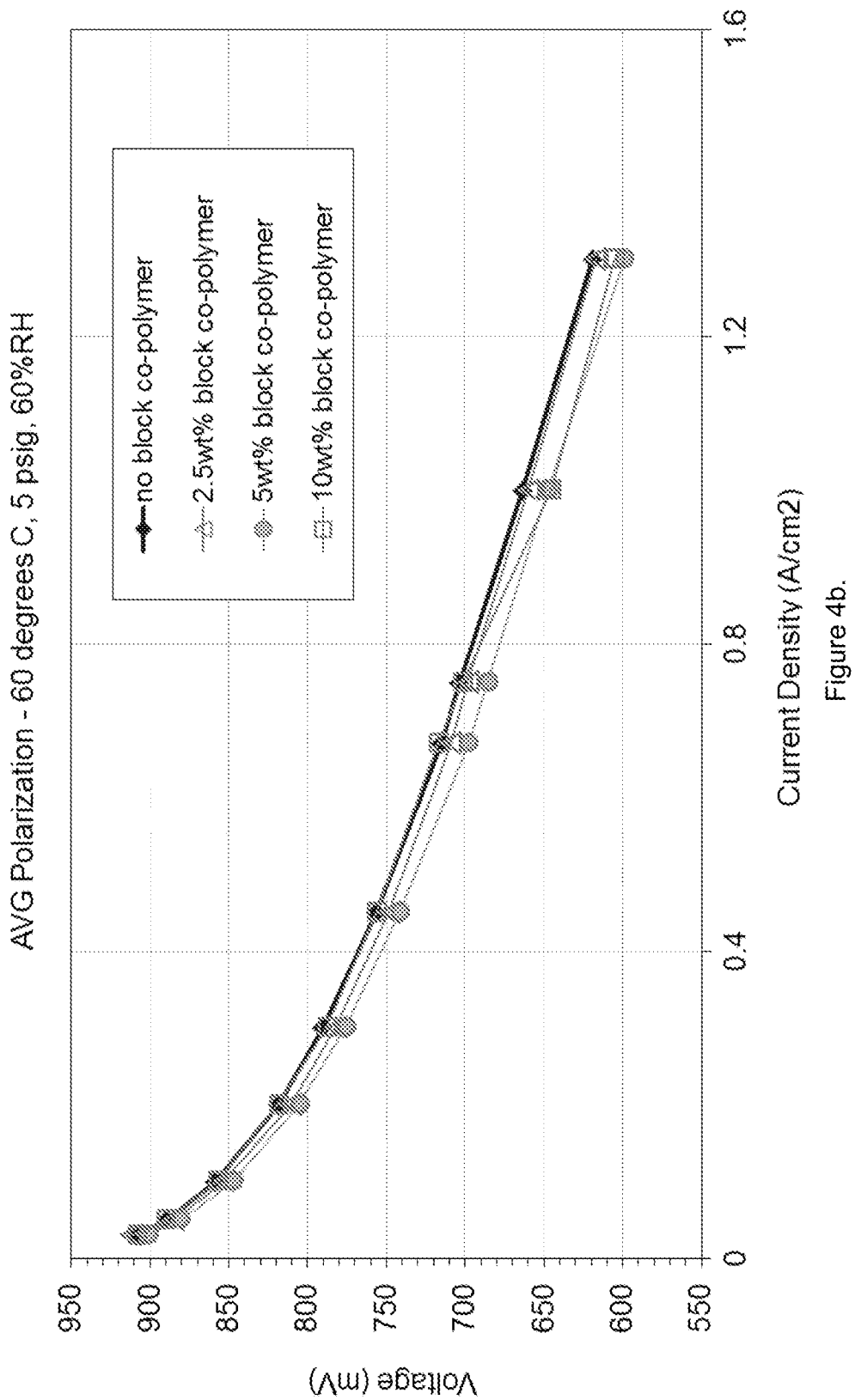

MEMBRANE ELECTRODE ASSEMBLY WITH IMPROVED COHESION

BACKGROUND

Technical Field

The present disclosure relates to membrane electrode assemblies for electrochemical cells, in particular, catalyst layers with improved cohesion.

Description of the Related Art

Electrochemical fuel cells convert fuel and oxidant into electricity. Solid polymer electrochemical fuel cells generally employ a membrane electrode assembly that includes a solid polymer electrolyte membrane disposed between two electrodes. The membrane electrode assembly is typically interposed between two electrically conductive flow field plates to form a fuel cell. These flow field plates act as current collectors, provide support for the electrodes, and provide passages for the reactants and products. Such flow field plates typically include fluid flow channels to direct the flow of the fuel and oxidant reactant fluids to an anode and a cathode of each of the membrane electrode assemblies, respectively, and to remove excess reactant fluids and reaction products. In operation, the electrodes are electrically coupled for conducting electrons between the electrodes through an external circuit. Typically, a number of fuel cells are electrically coupled in series to form a fuel cell stack having a desired power output.

The anode and the cathode each contain a layer of anode catalyst and cathode catalyst, respectively. The catalyst may be a metal, an alloy or a supported metal/alloy catalyst, for example, platinum supported on carbon black. The catalyst layer may contain an ion conductive material, such as NAFION® (provided by E. I. du Pont de Nemours and Co.) and/or a binder, such as polytetrafluoroethylene (PTFE). Each electrode further includes an electrically conductive porous substrate, such as carbon fiber paper or carbon cloth, for reactant distribution and/or mechanical support. The thickness of the porous substrate typically ranges from about 50 to about 250 microns. Optionally, the electrodes may include a porous sublayer disposed between the catalyst layer and the substrate. The sublayer usually contains electrically conductive particles, such as carbon particles, and, optionally, a water repellent material for modifying its properties, such as gas diffusion and water management. The catalyst may be coated onto the membrane to form a catalyst-coated membrane (CCM) or coated onto the sublayer or the substrate to form an electrode.

The catalyst is one of the most expensive components in a fuel cell due to the noble metals that are typically used. Such noble metals include platinum and gold, which are often mixed with or alloyed with other metals, such as ruthenium, iridium, cobalt, nickel, molybdenum, palladium, iron, tin, titanium, manganese, cerium, chromium, copper, and tungsten, to enhance preferred reactions and mitigate unwanted side reactions, which are different for the anode and the cathode.

The anode and cathode half-cell reactions in hydrogen gas fuel cells are shown in the following equations:

$$H_2 \rightarrow 2H^+ + 2e^- \tag{1}$$

$$\tfrac{1}{2}O_2 + 2H^+ + 2e^- \rightarrow H_2O \tag{2}$$

On the anode, the primary function is to oxidize hydrogen fuel to form protons and electrons. Depending on the fuel source, the anode catalyst may need to be tolerant to impurities. For example, carbon monoxide poisoning of the anode catalyst often occurs when operating on a reformate-based fuel. To mitigate carbon monoxide poisoning, a platinum alloy catalyst, such as platinum-ruthenium, is preferable on the anode.

On the cathode, the primary function is to reduce oxygen and form water. This reaction is inherently much slower than the anode reaction and, thus, the cathode catalyst loading is typically higher than the anode catalyst loading. One way of enhancing the cathode half-cell reaction is to improve the electrochemical activity and catalyst utilization of the catalyst layer, thereby reducing voltage losses related to catalytic kinetics.

Catalysts also need to be able to withstand degradation that may occur during fuel cell operation and fuel cell start-up and shutdown. Typical catalyst degradation modes include corrosion of the catalyst support material and platinum dissolution and agglomeration, which leads to a decrease in fuel cell performance due to the decreased platinum surface area. Conventional supported platinum catalysts on high surface area supports, such as platinum supported on carbon black, have high activity but are more prone to degradation. Catalyst degradation is an important issue because it has a detrimental impact on fuel cell lifetime and overall costs. To mitigate corrosion, graphitized carbon supports are preferable over carbon black supports because graphitized carbon supports are more stable and less susceptible to corrosion. However, graphitized carbon supports also have a lower surface area, which makes it difficult to homogeneously disperse noble metal catalysts onto graphitized carbon supports. Therefore, catalysts having noble metals dispersed on graphitized carbon supports typically show a lower electrochemical activity and fuel cell performance than catalysts having noble metals dispersed on high surface area supports, but better durability.

As a result, there still exists a need to improve MEA performance without sacrificing durability. The present description addresses these issues and provides further related advantages.

BRIEF SUMMARY

Briefly, the present disclosure relates to membrane electrode assemblies for electrochemical fuel cells.

In one embodiment, a membrane electrode assembly comprises an anode electrode comprising an anode catalyst layer, the anode catalyst layer comprising an anode catalyst and a first binder; a cathode electrode comprising a cathode catalyst layer, the cathode catalyst layer comprising a cathode catalyst and a second binder; and a polymer electrolyte membrane interposed between the anode electrode and the cathode electrode; wherein at least one of the first and second binders comprises an ionomer and a block co-polymer comprising poly(ethylene oxide) (PEO) and poly(propylene oxide) (PPO). As used herein, a block copolymer comprising PEO and PPO may be referred to as a "PEO-PPO" block copolymer. A block copolymer comprising PEO, PPO and a further block of PEO may be referred to as a "PEO-PPO-PEO" block copolymer, and a block copolymer comprising PPO, PEO and a further block of PPO may be referred to as a "PPO-PEO-PPO" block copolymer In specific embodiments, the at least one of the anode and cathode catalyst layers comprises about 1 wt % to about 10 wt % of the block co-polymer.

In another embodiment, a method of making a catalyst-coated membrane comprising the steps of: a) dissolving a non-proton-conducting (F108 block co-polymer comprising poly(ethylene oxide) and poly(propylene oxide) in an aqueous solution to form a block co-polymer solution; b) mixing the block co-polymer solution with an ionomer and a catalyst to form a catalyst ink; c) coating the catalyst ink on one side of an ion-exchange membrane to form a coated ion-exchange membrane; and d) drying the coated ion-exchange membrane to form the catalyst-coated membrane.

One embodiment provides an electrode comprising a catalyst layer, the catalyst layer comprising a catalyst and a binder comprising an ionomer and a block co-polymer comprising poly(ethylene oxide) and poly(propylene oxide).

These and other aspects will be evident upon reference to the attached drawings and following detailed description.

BRIEF DESCRIPTION OF THE FIGURES

In the figures, identical reference numbers identify similar elements or acts. The sizes and relative positions of elements in the figures are not necessarily drawn to scale. For example, the shapes of various elements and angles are not drawn to scale, and some of these elements are enlarged and positioned to improve figure legibility. Further, the particular shapes of the elements, as drawn, are not intended to convey any information regarding the actual shape of the particular elements, and have been solely selected for ease of recognition in the figures.

FIGS. 4a and 4b show the fuel cell testing results of four MEAs with varying amounts of the PEO-PPO-PEO block co-polymer in the cathode catalyst layer at 100% RH and 60% RH, respectively.

DETAILED DESCRIPTION

Unless the context requires otherwise, throughout the specification and claims which follow, the word "comprise" and variations thereof, such as "comprises" and "comprising" are to be construed in an open, inclusive sense, that is, as "including but not limited to".

Figure 1:
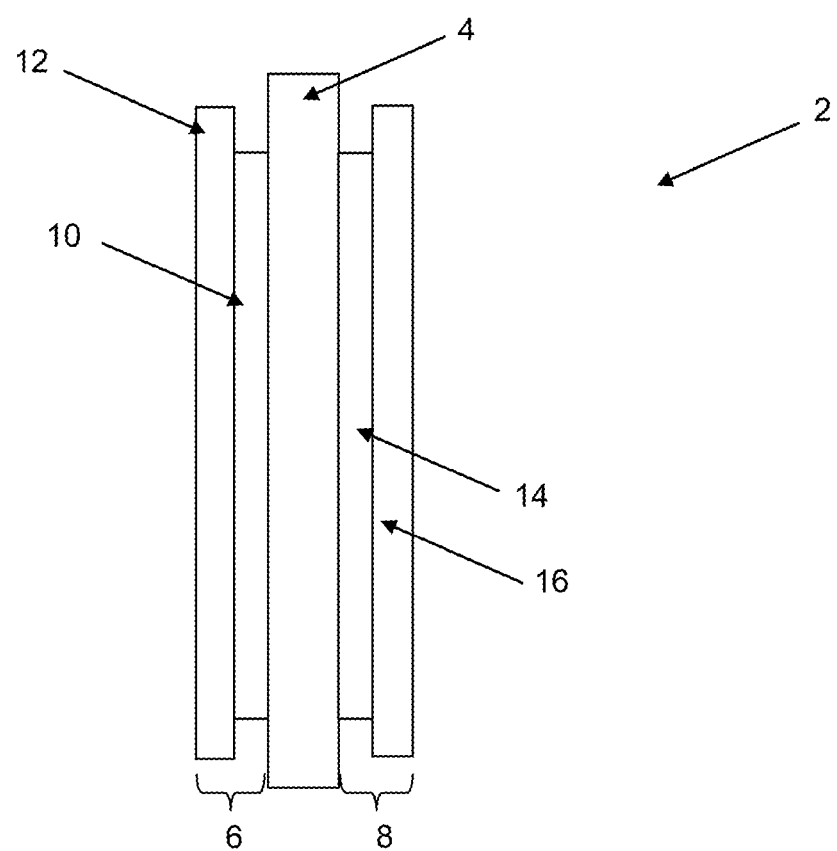
FIG. 1 shows a cross-section of an exemplary fuel cell according to one embodiment of the present description.

As discussed in the foregoing, an electrochemical fuel cell 2 includes a solid electrolyte 4 interposed between an anode electrode 6 and a cathode electrode 8, an anode catalyst layer 10 between electrolyte membrane 4 and anode gas diffusion layer 12, and a cathode catalyst layer 14 between solid electrolyte 4 and cathode gas diffusion layer 16, as shown in FIG. 1. The inventors have surprisingly discovered that catalyst flaking was significantly reduced while cohesion of the cathode catalyst layer and adhesion to the membrane were significantly increased by incorporating a block co-polymer comprising poly(ethylene oxide) and poly(propylene oxide) into the binder of the catalyst layer. Without being bound by theory, it is suspected that the PEO-PPO block co-polymer improves cohesion and adhesion of the catalyst layer by increasing polymer wet density, thereby improving or increasing contact between the catalyst particles and the ionomer, and may improve fuel cell performance and durability.

In some embodiments, a PEO-PPO block co-polymer in the first and/or second binder of the catalyst layer(s) has a molecular weight ranging from about 3500 g/mol to about 14000 g/mol. In some embodiments, the molecular weight ranges from about 4000 g/mol to about 13500 g/mol, from about 5000 g/mol to about 12500 g/mol, from about 6000 g/mol to about 11500 g/mol, from about 7000 g/mol to about 10500 g/mol, from about 8000 g/mol to about 9500 g/mol, from about 4000 g/mol to about 10000 g/mol, from about 3500 g/mol to about 9500 g/mol, from about 3500 g/mol to about 8500 g/mol, or from about 9000 g/mol to about 14000 g/mol.

Such PEO-PPO block co-polymers are non-proton-conductive when being incorporated into the catalyst layer, that is, they do not contain any proton conducting groups, such as sulfonic acids, phosphonic acids and phosphoric acids. The PEO-PPO block co-polymer may be, for example, PEO-PPO-PEO, PPO-PEO-PPO, and combinations thereof. Exemplary PEO-PPO block co-polymers may include, but are not limited to, those sold under the Pluronic® tradename, such as Pluronic® F108, F127, R25, and P123. In some embodiments, the block co-polymer comprises the following structure:

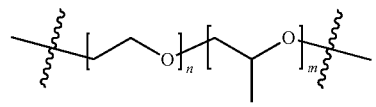

wherein:

n and m are each independently an integer greater than zero. In some embodiments, n ranges from about 1 to about 320. In certain embodiments, m ranges from about 1 to about 250.

In certain more specific embodiments, the block co-polymer comprises the following structure:

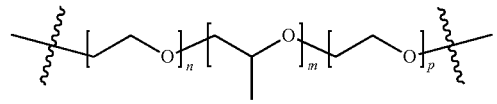

wherein:

n, m and p are each independently an integer greater than zero. In some embodiments, n ranges from about 1 to about 320. In certain embodiments, m ranges from about 1 to about 250. In some embodiments, p ranges from about 1 to about 320.

In some embodiments, the block co-polymer comprises the following structure:

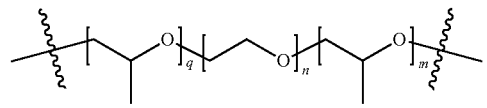

wherein:

n, m and p are each independently an integer greater than zero. In some embodiments, n ranges from about 1 to about 320. In certain embodiments, m ranges from about 1 to about 250. In some embodiments, q ranges from about 1 to about 250.

In some of the foregoing embodiments, n ranges from about 1 to about 300, about 10 to about 250, about 10 to about 200, about 10 to about 150, about 10 to about 100, about 10 to about 50, about 5 to about 35, about 5 to about 25, about 5 to about 50 or about 5 to about 35.

In some of the foregoing embodiments, p ranges from about 1 to about 300, about 10 to about 250, about 10 to about 200, about 10 to about 150, about 10 to about 100, about 10 to about 50, about 5 to about 35, about 5 to about 25, about 5 to about 50 or about 5 to about 35.

In some of the foregoing embodiments, m ranges from about 1 to about 200, about 10 to about 150, about 10 to about 100, about 10 to about 50, about 10 to about 35, about 10 to about 25, about 5 to about 75, about 5 to about 50, about 5 to about 25 or about 5 to about 20.

In some of the foregoing embodiments, q ranges from about 1 to about 200, about 10 to about 150, about 10 to about 100, about 10 to about 50, about 10 to about 35, about 10 to about 25, about 5 to about 75, about 5 to about 50, about 5 to about 25 or about 5 to about 20.

In some embodiments, the electrode is an anode. In some related embodiments the electrode comprises a anode catalyst layer and an anode catalyst according to the embodiments described herein.

In some embodiments, the electrode is a cathode. In some related embodiments the electrode comprises a cathode catalyst layer and a cathode catalyst according to the embodiments described herein.

In one embodiment, the catalyst in the anode and cathode catalyst layers is a noble metal or noble metal alloy. In specific embodiments, catalyst in the anode and cathode catalyst layers may be platinum, gold, ruthenium, iridium, cobalt, nickel, molybdenum, palladium, iron, tin, titanium, manganese, cerium, chromium, copper, and tungsten, and alloys, solid solutions, and intermetallic compounds thereof. The noble metal loading of the anode and cathode electrode should be low to minimize cost. For example, the platinum loading of the anode electrode may range from about 0.01 mg Pt/cm$^2$ to about 0.15 mg Pt/cm$^2$ while the platinum loading of the cathode electrode may range from about 0.1 mg Pt/cm$^2$ to about 0.6 mg Pt/cm$^2$.

The catalyst in the anode and cathode catalyst layers may be supported on a carbonaceous support, such as activated carbon, carbon black, carbon that is at least partially graphitized, and graphite. Other suitable carbonaceous support materials include carbon nanofibers and carbon nanotubes. In specific embodiments, the carbonaceous support may have a specific surface area of at least about 150-2000 m$^2$/g. In other examples, non-carbonaceous supports include oxide and nitride supports. These include, but are not limited to, $TiO_2$, $Ti_4O_7$, $TiRuO_2$, $Ta_2O_5$, $Nb_2O_5$.

In some embodiments, the anode and/or cathode catalyst layers may contain a mixture of catalysts and/or supported catalysts. For example, the cathode catalyst layer may contain a mix of a supported platinum alloy catalyst and a supported platinum catalyst.

In some embodiments, the anode and cathode catalyst layers further comprise an additional binder component, for example, an ionomer. In some embodiments, the ionomer is perfluorinated, partially fluorinated, or hydrocarbon-based. For example, the ionomer may be a sulfonic-acid based perfluorinated ionomer, such as those that are sold under the Nafion® (DuPont), Aciplex® (Asahi Kasei Corporation), and Aquivion® (Solvay Plastics) tradenames, as well as ionomers from 3M.

As discussed, the PEO-PPO-PEO block co-polymer showed improved cohesion and adhesion of the catalyst layer when it was mixed with the binder of the catalyst layer. Therefore, the PEO-PPO-PEO block co-polymer may be suitable for catalyst layers that are prone to cracking and/or flaking so that manufacturability is improved. For example, catalyst layers employing catalysts with very high surface area and/or too little ionomer in the binder are typically prone to catalyst layer cracking or flaking. Furthermore, without being bound by theory, improved adhesion and cohesion of the anode and cathode catalyst layers may improve durability, for example, reducing degradation associated with catalyst layer delamination due to aggressive fuel cell operating conditions and environment.

PEO-PPO-PEO has been shown to improve cohesion and adhesion of the catalyst layer and PPO-PEO-PPO may exhibit enhanced properties with respect to water management in the catalyst layer as PPO is more hydrophobic than PEO. Therefore, the PPO-PEO-PPO block co-polymer may result in a more hydrophobic catalyst layer than the PEO-PPO-PEO block co-polymer. In some embodiments, the first and/or second binder(s) comprise a mixture of PEO-PPO-PEO and PPO-PEO-PPO block co-polymers.

Block polymers may be formed as blocks of two or more polymeric segments (e.g., PEO or PPO blocks) via ring opening polymerization. Typical Pluronic®-type triblock copolymers are formed from anionic ring opening polymerization of ethylene oxide and propylene oxide using an activator such as potassium hydroxide. The central poly propylene oxide is synthesized as precursor followed by chain extension through polymerization of ethylene oxide. A block copolymer is preferred over individual polymeric segments, such as PEO and PPO on their own, as block polymers typically exhibit amphiphilic properties with enhanced surface active properties as compared to individual polymeric segments.

In certain embodiments, the thickness of the anode and cathode catalyst layers with noble metals ranges from about 1 micron to about 12 microns. In some embodiments, the catalyst layer has a thickness ranging from about 1 micron to about 20 microns, from about 1 micron to about 15 microns, from about 1 micron to about 10 microns, from about 5 micron to about 20 microns, from about 5 micron to about 15 microns, or from about 5 micron to about 10 microns.

A catalyst layer including a PEO-PPO block co-polymer may be especially useful for thicker catalyst layers (such as about 20 microns and above), which are usually susceptible to cracking, such as catalyst layers that utilize non-precious metal catalysts. In certain embodiments, the catalyst layer comprises a non-precious metal catalyst. In certain more specific embodiments, the catalyst layer has a thickness greater than about 20 microns. In certain embodiments, the catalyst layer thickness ranges from about 20 microns to about 30 microns, from about 20 microns to about 40 microns, from about 20 microns to about 50 microns, from about 20 microns to about 60 microns, from about 20 microns to about 70 microns, from about 80 microns to about 30 microns, from about 20 microns to about 90 microns, or from about 20 microns to about 100 microns.

As the name indicates, non-precious metal catalysts do not include a precious metal. Non-precious metal catalysts include, but are not limited to, transition metal nitrogen-containing complexes, conductive polymer-based catalysts, transition metal chalcogenides, metal oxides, metal carbides, metal nitrides, metal oxynitrides, metal carbonitrides and enzyme compounds. In some embodiments, the non-precious metal catalyst comprises a metal selected from the group consisting of iron, cobalt, and nickel. In some embodiments, the non-precious metal comprises a transition metal. In certain specific embodiments, the non-precious metal catalyst comprises carbon or nitrogen and a metal selected from the group consisting of iron and cobalt. Other non-precious metal catalysts are known in the art, including those described in Banham, *Journal of Power Sources,* 285, (2015) 334-348, which is incorporated herein in its entirety.

Figure 2:
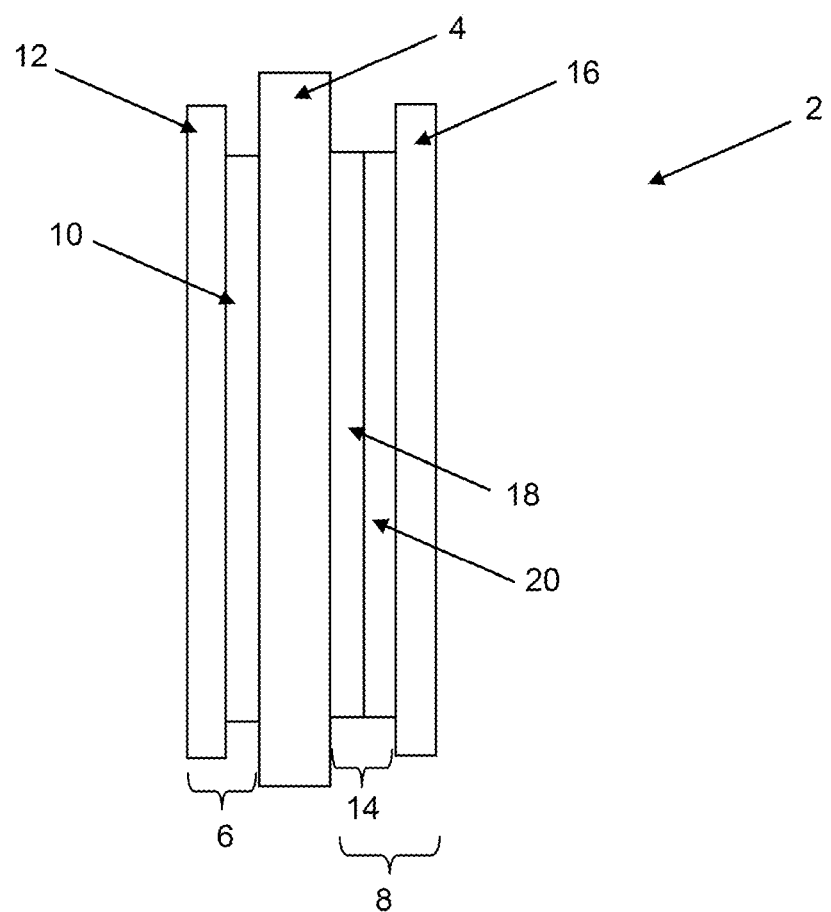
FIG. 2 shows a cross-section of an exemplary fuel cell according to another embodiment of the present description.

In some embodiments, the cathode catalyst layer may be divided into two or more cathode catalyst sublayers 18, 20, such as that shown in FIG. 2. In this situation, any one or all of the cathode catalyst sublayers may be treated with the block co-polymer.

The anode gas diffusion layer and cathode gas diffusion layer should be electrically conductive, thermally conductive, adequately stiff for mechanical support of the catalyst layer and membrane, sufficiently porous to allow for gas diffusion, and thin and lightweight for high power density. Thus, conventional gas diffusion layer materials are typically chosen from commercially available woven and non-woven porous carbonaceous substrates, including carbon fiber paper and carbon fabrics, such as carbonized or graphitized carbon fiber non-woven mats. Suitable porous substrates include, but are not limited to, TGP-H-060 and TGP-H-090 (Toray Industries Inc., Tokyo, Japan); AvCarb® P50 and EP-40 (Ballard Material Products Inc., Lowell, Mass.); and GDL 24 and 25 series material (SGL Carbon Corp., Charlotte, N.C.). In some embodiments, the porous substrate may be hydrophobized, and may optionally include at least one gas diffusion sublayer having carbon and/or graphite in fibrous and/or particulate form.

The polymer electrolyte membrane may be any suitable proton-conducting material or ionomer, such as, but not limited to, Nafion® (DuPont), Flemion® (Asahi Glass, Japan), Aquivion® (Solvay Plastics), GORE-SELECT® (W.L. Gore & Associates), and Aciplex® (Asahi Kasei, Japan).

The MEA and catalyst layers and sublayers can be made via methods known in the art. For example, the catalyst ink may be directly applied to the gas diffusion layer or membrane by screen-printing, knife-coating, spraying or gravure coating, or decal-transferred to the gas diffusion layer or membrane. The catalyst ink may be applied in a single application or in multiple thin coatings to achieve the desired catalyst loading and/or catalyst layer structure.

In one method to make a catalyst-coated membrane, the block co-polymer comprising PEO-PPO is dissolved in an aqueous solution to form a block co-polymer solution, then mixed with an ionomer to form an ionomer-block solution, and then mixed with catalyst to form a catalyst ink. The catalyst ink is coated on one or both sides of an ion-exchange membrane to form a coated membrane (or coated on a release sheet to decal transfer the catalyst layer to the membrane to form a coated membrane), or coated on one side of a gas diffusion layer to form an electrode. The coated ion-exchange membrane or electrode is then dried to form a catalyst-coated membrane or gas diffusion electrode. The resulting catalyst layer may contain from about 1 wt % to about 10 wt % of the block co-polymer, of which a portion may be removed from the catalyst-coated membrane or electrode during manufacturing and/or operation in a fuel cell. The portion that is removed may range from about 30 wt % to about 60 wt %.

In some embodiments, the coated ion-exchange membrane or electrode may be dried or annealed at an elevated temperature compared to room temperature, for example, at about 40 degrees Celsius to about 80 degrees Celsius. In some embodiments, the coated ion-exchange membrane or electrode may be compacted at an elevated pressured, for example, at about 5 bar to about 25 bar. In further embodiments, the coated ion-exchange membrane or electrode may be simultaneously heated and compacted at an elevated temperature and pressure.

EXAMPLES

Example 1: Adhesion Test

About 10 wt % of a representative PEO-PPO block co-polymer (Pluronic® F108 from Sigma-Aldrich) was mixed with 1100 EW Nafion® ionomer and stirred for one hour at room temperature. A catalyst having about 47 wt % platinum supported on a low surface area carbon support (TKK, Japan) was added to the mixture under stirring, followed by shear mixing for several minutes and then microfluidized to form a cathode catalyst ink. The cathode catalyst ink was then coated onto a Nafion® membrane (DuPont) and air dried for form a half catalyst-coated membrane. A control half catalyst-coated membrane was also made without the block co-polymer.

Figure 3A:
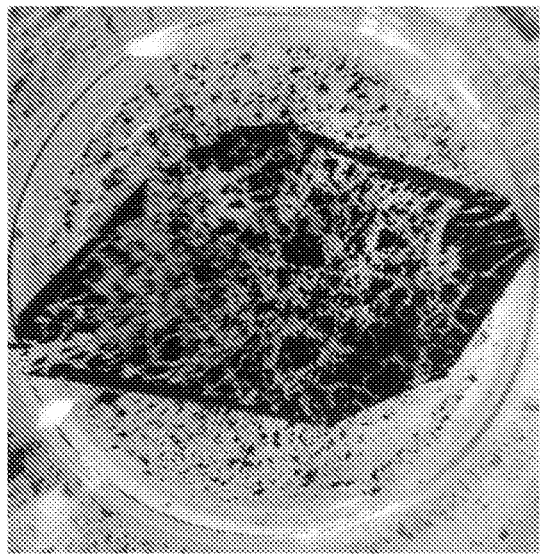
FIGS. 3a and 3b show pictures of catalyst-coated membranes with and without the PEO-PPO-PEO block co-polymer in the catalyst layer.
Figure 3B:
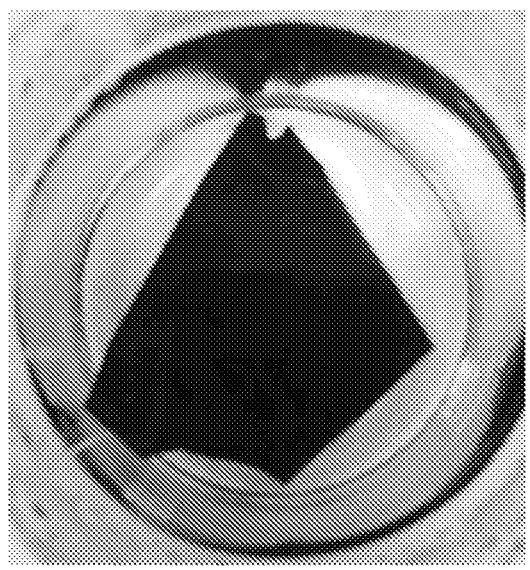

To test for adhesion properties, both half catalyst-coated membranes were immersed in 750 mL of water at about 80 degrees Celsius for about 2 to 6 hours. As shown in FIGS. 3a and 3b, the catalyst layer in the control half catalyst-coated membrane had flaked off after being immersed in hot water for only 2 hours (FIG. 3a) while catalyst layer in the half catalyst-coated membrane with the block co-polymer was still intact after being immersed in hot water for 6 hours (FIG. 3b). Therefore, the block co-polymer seemed to improve adhesion and cohesion of the catalyst layer.

Example 2: Polymer Dissolution

To determine the amount of block co-polymer that may dissolve out of the catalyst layer, two half catalyst-coated membranes were made with 10 wt % of the representative PEO-PPO block co-polymer using the method above (Example 1). One of the half catalyst-coated membranes was also annealed at about 150 degrees Celsius and compacted at 15 bar pressure for about 3 minutes to recreate decal transfer conditions of the catalyst layer to the membrane.

Both of the half catalyst-coated membranes were washed in water at about 75 degrees Celsius for about 6 hours and the liquid was analyzed for total organic carbon (TOC). It was then back calculated to determine the amount of wash-out of the PEO-PPO block co-polymer, which was about 60% for non-annealed sample and about 35% for annealed sample. Without being bound by theory, it is suspected that at least one of the annealing and compaction process decreased dissolution of the block co-polymer.

Example 3: MEA Testing

Four MEAs with 45 $cm^2$ active area were made with varying amounts of the representative PEO-PPO block co-polymer as described in Example 1 in the binder of the cathode catalyst layer (at 0 wt %, 2.5 wt %, 5 wt % and 10 wt %). The PEO-PPO block co-polymer was mixed with 1100 EW Nafion® ionomer and stirred for one hour at room temperature. A catalyst having 40 wt % platinum supported on a high surface area carbon support (TKK, Japan) was added to the mixture under stirring, followed by shear mixing for several minutes and then microfluidized to form a cathode catalyst ink. The cathode catalyst ink was then coated onto a reinforced perfluorosulfonic acid membrane (W.L. Gore & Associates). An anode catalyst ink having platinum supported on a high surface area carbon and 1100

EW Nafion® ionomer was coated onto a release sheet and decal transferred to the membrane at 150 degrees Celsius to form a catalyst-coated membrane. The anode and cathode catalyst loadings for all of the MEAs were about 0.1 mg Pt/cm$^2$ and about 0.4 mg Pt/cm$^2$, respectively. The MEAs also had hydrophobicized carbon fibre paper with microporous layers (AvCarb®) as the gas diffusion layers, which were bonded together with the catalyst-coated membranes. The MEAs that were made had the following cathode composition: MEA 1 with 0 wt % block co-polymer/33 wt % Nafion®, MEA 2 with 2.5 wt % block co-polymer/33 wt % Nafion®, MEA 3 with 5 wt % block co-polymer/33 wt % Nafion®, MEA 4 with 10 wt % block co-polymer/33 wt % Nafion® (all weight percentages indicated of the block co-polymer are at the starting weight percentage).

Figure 4A:
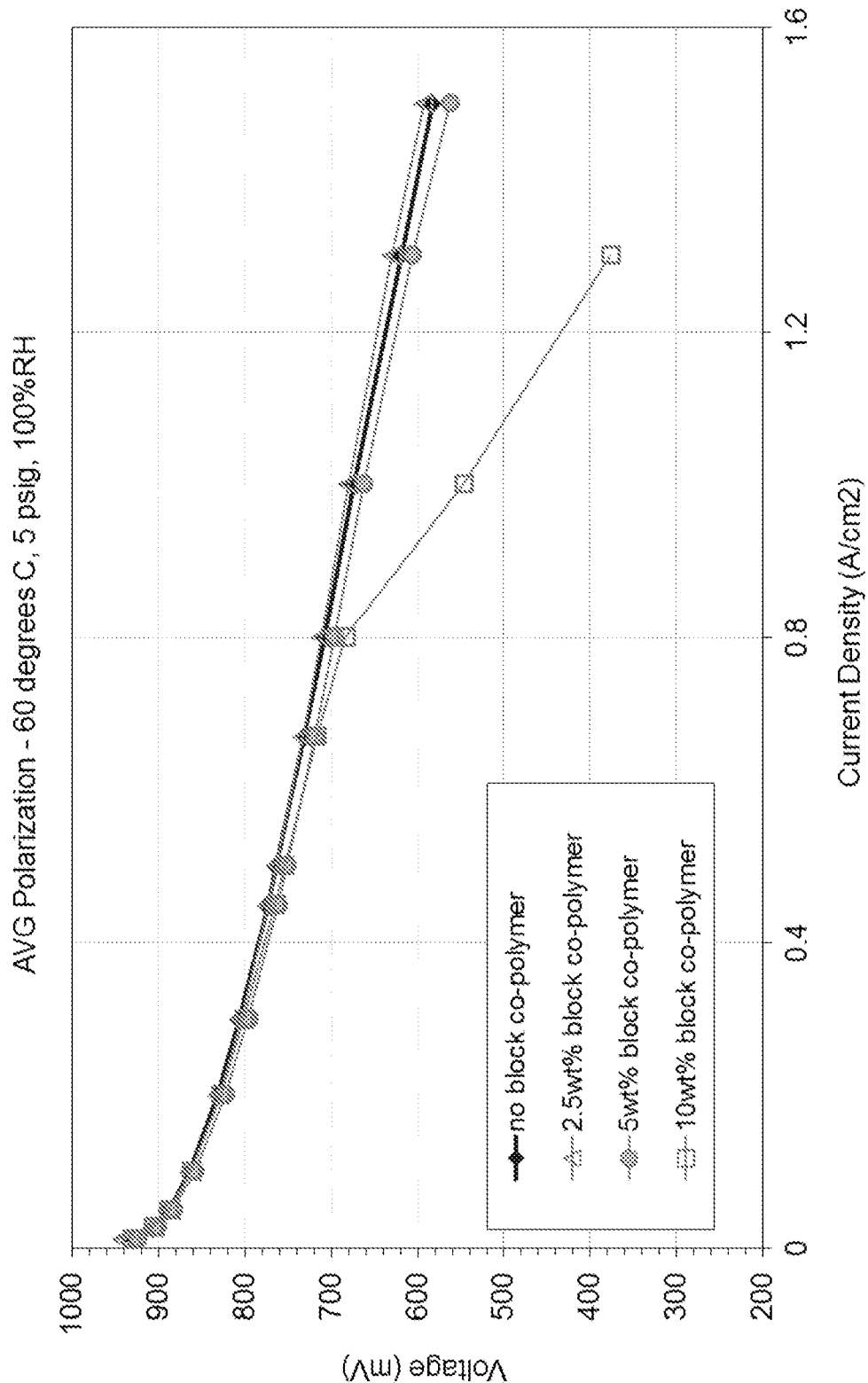

For fuel cell testing, the MEAs were placed between graphite plates and conditioned overnight at 70 degrees Celsius, 5 PSIG and 100% RH. An air polarization was performed at 60 degrees Celsius and 5 PSIG, at both 100% and 60% RH. The results are shown in FIGS. 4a and 4b, respectively. It is clear that at 60% RH, the addition of the PEO-PPO block co-polymer had minimal impact on performance at all current densities. However, at 100% RH, the addition of the PEO-PPO block co-polymer at 10 wt % had more substantial performance impact at high current density.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety. This application also claims the benefit of U.S. Provisional Patent Application No. 62/485,325, filed Apr. 13, 2017, and is incorporated herein by reference in its entirety.

While particular elements, embodiments, and applications of the present disclosure have been shown and described, it will be understood that the disclosure is not limited thereto since modifications may be made by those skilled in the art without departing from the spirit and scope of the present disclosure, particularly in light of the foregoing teachings.

What is claimed is:

1. A membrane electrode assembly comprising:
   an anode electrode comprising an anode catalyst layer, the anode catalyst layer comprising an anode catalyst and a first binder;
   a cathode electrode comprising a cathode catalyst layer, the cathode catalyst layer comprising a cathode catalyst and a second binder; and
   a polymer electrolyte membrane interposed between the anode electrode and the cathode electrode;
   wherein at least one of the first and second binders comprises an ionomer and a block co-polymer comprising poly(ethylene oxide) and poly(propylene oxide).

2. The membrane electrode assembly of claim 1, wherein the block co-polymer comprises poly(ethylene oxide)-poly(propylene oxide)-poly(ethylene oxide).

3. The membrane electrode assembly of claim 1, wherein the block co-polymer comprises poly(propylene oxide)-poly(ethylene oxide)-poly(propylene oxide).

4. The membrane electrode assembly of claim 1, wherein the block co-polymer comprises a molecular weight of about 3500 g/mol to about 14000 g/mol.

5. The membrane electrode assembly of claim 1, wherein the at least one of the anode and cathode catalyst layers comprises about 1 wt % to about 10 wt % of the block co-polymer.

6. The membrane electrode assembly of claim 1, wherein the at least one of the anode and cathode catalyst layers comprises about 1 wt % to about 7 wt % of the block co-polymer.

7. The membrane electrode assembly of claim 1, wherein the anode and cathode catalyst are selected from the group consisting of platinum, gold, ruthenium, iridium, cobalt, nickel, molybdenum, palladium, iron, tin, titanium, manganese, cerium, chromium, copper, and tungsten, and alloys, solid solutions, and intermetallic compounds thereof.

8. The membrane electrode assembly of claim 1, wherein the anode and cathode catalysts comprise a non-precious metal.

9. The membrane electrode assembly of claim 1, wherein the cathode catalyst layer comprises at least two catalyst sublayers, wherein at least one of the catalyst sublayers comprises the block co-polymer.

10. A fuel cell comprising the membrane electrode assembly of claim 1.

* * * * *